Oct. 9, 1945.  M. WATTER  2,386,521
AUTOMATIC FLAP CONTROL
Filed Jan. 1, 1943  2 Sheets-Sheet 2

*INVENTOR*
Michael Watter.
BY John P Tarbox
*ATTORNEY*

Oct. 9, 1945

2,386,521

UNITED STATES PATENT OFFICE 2,386,521

AUTOMATIC FLAP CONTROL

Michael Watter, Philadelphia, Pa., assignor to Edward G. Budd Manufacturing Company, Philadelphia, Pa., a corporation of Pennsylvania Application January 1, 1943, Serial No. 471,000

3 Claims. (Cl. 244—42)

This invention relates to aircraft and primarily to flap control means for facilitating airplane take-off and landing.

In airplane operation particularly in regions where airfields of limited runway size exist it is important that wing lift be accentuated at take-off and landing when lower speeds prevail. To some extent wing lift may be assisted by increasing the angle of attack but in landing this is insufficient and in take-off, during the initial run, it is harmful. It has been recognized by aircraft engineers that the lowering of wing flaps, or movement of other auxiliary lift increasing devices, provides an effective lift increment for the wings. Such flap operation, however, adds another to the many controls which the pilot must utilize at take-off or landing. Moreover, a danger in flap control resides in the fact that when manually operated at take-off and the speed increases to normal speed rate without raising the flap, or when lowered at too high a speed, the flap or its controls may be damaged.

Among the important objects of this invention is to provide means for automatically controlling wing lift by wing flaps, during take-off, flight and landing.

Another object is to provide means for holding the flaps positively in lowered position at all wing flap pressures below a predetermined value. An object also is to provide flap control means operable to lower the flaps at different flap pressures at landing and take-off. Still another object is to provide automatic wing lift control which is proportional to the loading on the wing flap.

An important object is to utilize mechanical strain in the flap operating mechanism for controlling the movement of the flap.

Other objects include the provision of means for automatically interrupting the motor circuit at the limit of the flap movement in either direction, for maintaining the flaps in raised position at will by electrical means, for readily varying the load differential on the flap at which the apparatus is operative at take-off and landings, for supplying a dual manual and electrical flap control, for relieving the pilot of manual flap control, for preventing flap damage due to over pressures, for simplifying the flap control mechanism in general, and other objects as will appear in connection with the disclosure.

The above objects are materialized in the invention, a specific embodiment and application of which, which may be preferred, being hereinafter described and illustrated in the accompanying drawings, in which.

Figure 1:
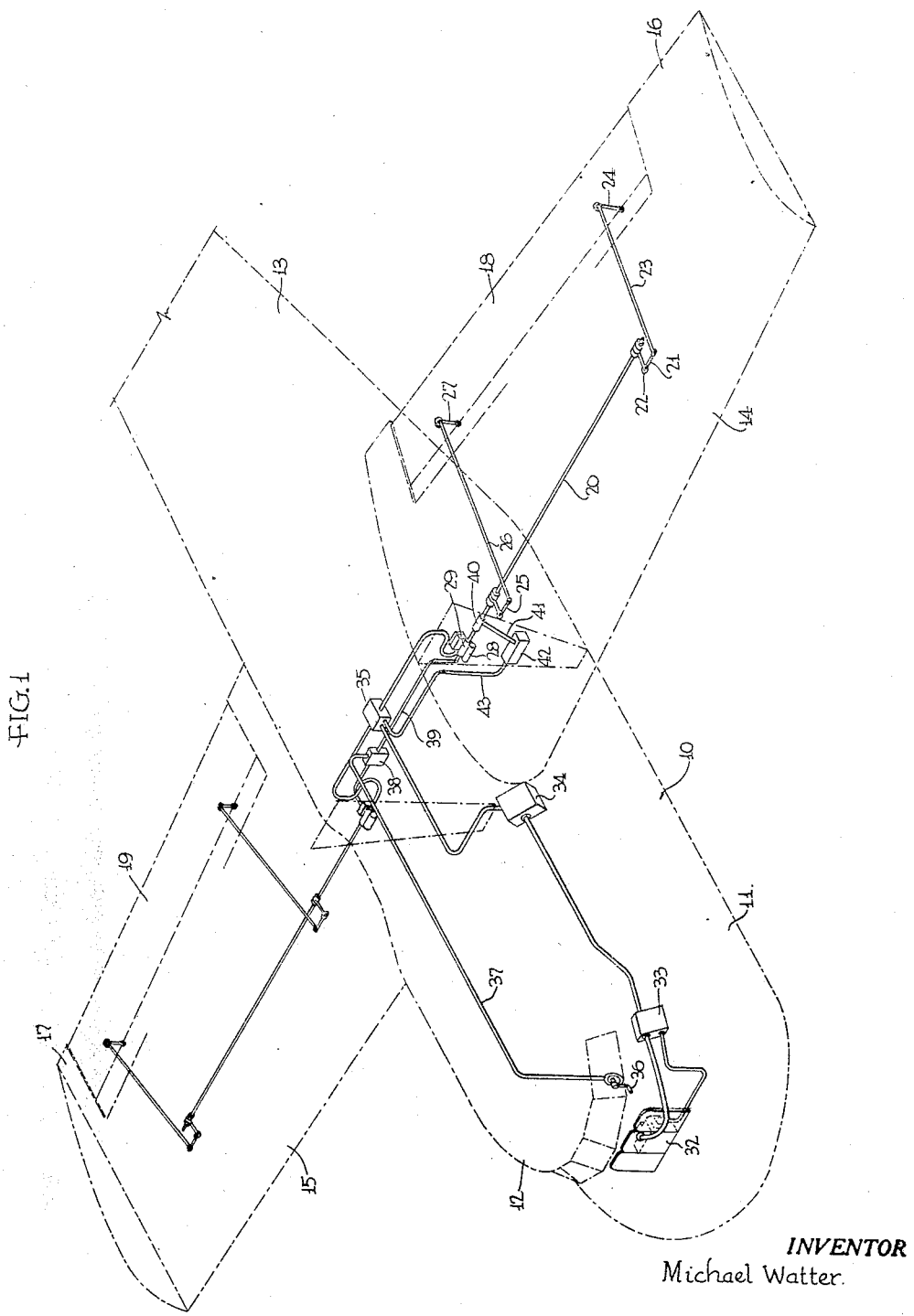
Fig. 1 is a perspective of an airplane showing the general mode of wing flap control installation.

In dotted outline in Fig. 1 is a diagrammatic showing of an airplane 10, having a fuselage 11, cockpit 12, tail 13 and wings 14 and 15. The trailing wing edges 16 and 17 include wing flaps 18 and 19 pivotally supported on the wing for up and down flexure.

The wing flap operating apparatus is indicated in full lines in Fig. 1, and includes an assemblage of rods, levers, motors and gearing all controlled from the cockpit instrument board. Since the apparatus for both wings are symmetrical the description will be confined to wing 14. On wing 14 a push-pull rod 20 connects pivotally with bell crank 21 pivoted at 22 and operates the flap 18 to raise and lower the same through rod 23 pivoted to flap rod 24. Similar connections to the flap are made through bell crank 25 and rods 26 and 27.

Axial movement is imparted to the push-pull rod 20 by means of an electric motor operating through a conventional friction clutch, gearing and screw-pinion connection 29 to the push-pull rod 20. The motor 28 is operable in forward and reverse directions and hence imparts forward and reverse rotation to the screw 30 (Fig. 2) thus effecting axial to and fro movement of the threaded non-rotatable element 31 integral with the push-pull rod.

Switches are provided on the pilot instrument board 32 with cables connecting with junction boxes 33, 34 and 35 to the motor 28. Additionally, mechanical flap control means is provided in the hand lever 36 in the cockpit connecting by flexible shafting 37 to the gear box 38 and thence to the push-pull rod through flexible shafting 39 and suitable gearing.

The control resistance unit or strain gauge 40 is incorporated in the push-pull rod 20 with cable connections 41 to control box 42 and thence by cable 43 to the motor and switch circuits.

Figure 3:
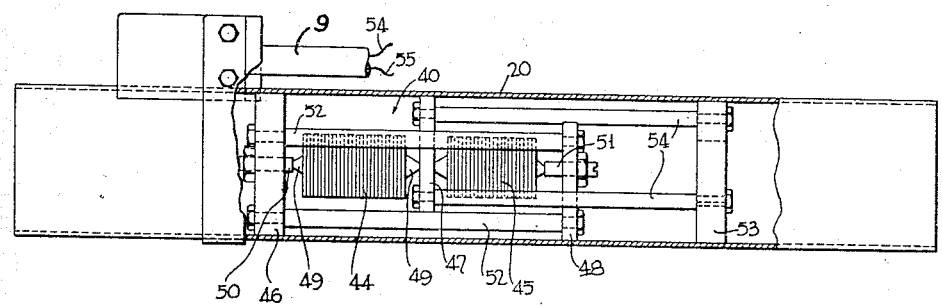
Fig. 3 is a detail in part section of the pressure control unit.

Reference is made to Fig. 3 for details of the control resistance unit. This element 40 comprises two carbon pile resistance elements 44 and 45 positioned within a steel tube incorporated in the push-pull rod 20 and supported by transverse plates 46, 47 and 48 through cone shaped end pieces 49 which engage receiving depressions formed either in the plate itself as in plate 47, or in the ends of pivot pins 50 and 51 the latter being insulated from the supports and adjustable for variation of carbon pile resistance. Plates 47 and 48 are roughly triangular in shape with triangle ends engaging and supported by the inner tube wall. Rods 52 and 54 secured to the triangle ends of plates 47 and 48 and to fixed plates 46 and 53 serve to hold the carbon pile elements 44 and 45 in position and assist in varying the resistance thereof.

Variation in resistance of both the carbon elements 44 and 45 is assisted by fixedly securing the triangle ends of plate 47, which normally floats between the two resistance elements, to the fixed plate 53 by means of connecting rods 54.

It now appears that assuming a normal force state in the rod 20, if this rod is subjected to tension due to the pull of the wing flaps, the strain induced in the rod between fixed plates 46 and 53 will bring about compression of carbon pile 45 and release of carbon pile 44. This results in an increase of electrical resistance in element 44 and a decrease of resistance in element 45, and consequently if these two elements are properly connected in a bridge circuit, the variation of tension may be observed. To this end the plate 47 is grounded, and the insulated pivot pins 50 and 51 are connected to lead-out wires 54 and 55 in cable 9.

Figure 2:
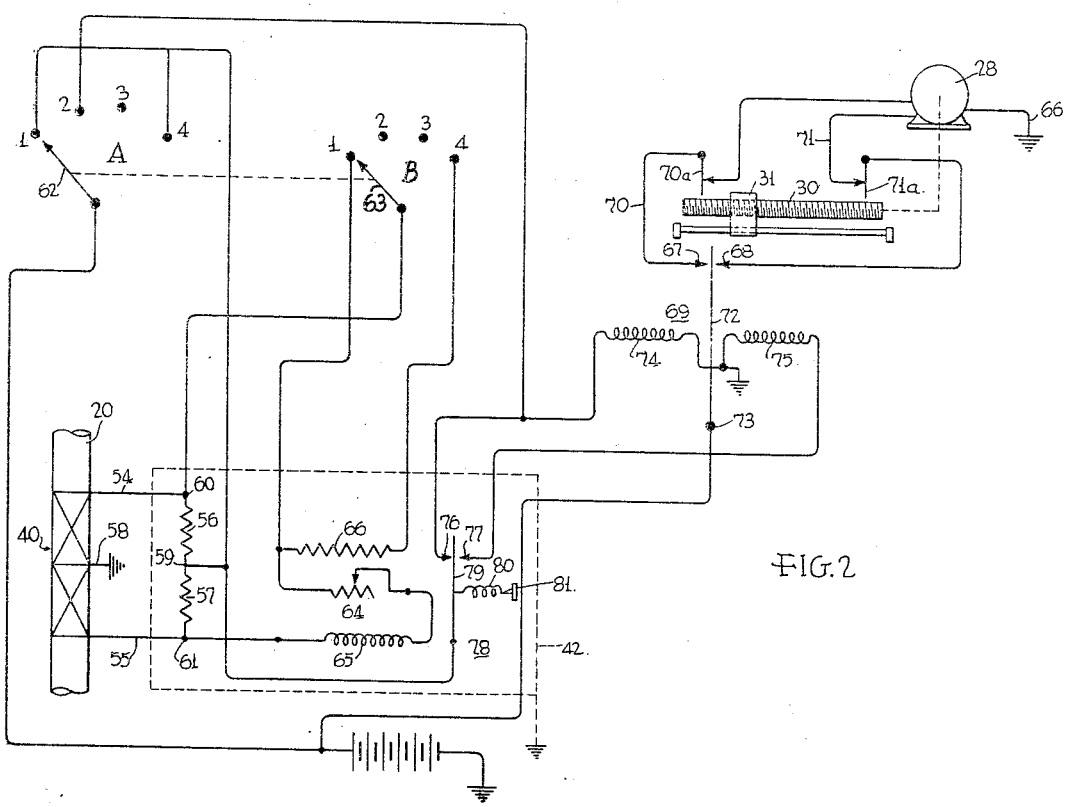
Fig. 2 is a wiring diagram of the control circuit.

Reference to the wiring diagram of Fig. 2 may now be made. As here shown, the grounded control box 42, which is preferably shock mounted, is indicated in dotted outline and includes two resistances 56 and 57 connected in series with the carbon resistance 44 and 45 of control element 40. These resistances form the four elements of a bridge circuit, current being supplied at points 58 and 59 and the bridge being formed between parts 60 and 61.

In order to place this bridge circuit under the control of the pilot, panel gang switches A and B are provided each having four contacts numbered 1, 2, 3 and 4, and tandem movable contact arms 62 and 63. The pivot pin of A contact 62 is connected to the positive pole of a battery, preferably the storage battery of the airplane, with a voltage usually between 20 and 24 volts, the negative battery pole being grounded. The pivot pin of B contact 63 is connected to bridge point 60. A1 and A4 contacts are connected to bridge point 59. B1 contact is connected through a temperature responsive variable resistor 64 and a sensitive relay coil 65 to the bridge point 61. B4 contact is connected through resistor 66 to B1 contact.

It is thus apparent that with A1 and B1 contacts engaged by the associated switch arms 62 and 63, power is supplied the bridge circuit at points 58 and 59 and variation in bridge balance voltage is applied at bridge points 60 and 61 to vary the current through the relay 65.

Continuing the circuit description the motor which is grounded at 66 on the negative side of the armature has dual field circuit wires to relay contacts 67 and 68 of relay 69 through the limit switches 70 and 71. Each of these switches includes a spring contact members 70a and 71a which are adapted to be opened by the push-pull rod screw member 31 when the latter is moved to the screw rod limit by motor rotation. The movable armature 72 of relay 69 is pivoted at 73 and connected to the positive side of the battery. Thus it appears that the current through the motor field may be reversed by movement of armature 72 from points 67 to 68, thereby securing a reversal in the direction of motor rotation.

Means for moving relay armature 72 between contacts 67 and 68 comprise relay coils 74 and 75, these coils being connected serially with the junction point grounded, and the outer coil ends connected to the contacts 76 and 77 of sensitive relay 78. The movable armature 79 of relay 78 is normally held in engagement with contact 77 by coil spring 80, the base 81 of which is adjustably mounted to vary the spring tensions. The pivot point of armature 79 is connected to bridge point 59. Switch contact A2 is also connected to contact 76 of relay 78.

The operation of the flap control may now be detailed. When the airplane is grounded A and B switch contacts are normally at the 3 or "off" points. Just before take-off the A1 and B1 contacts are made thus energizing the bridge circuit. Since the plane is at rest, however, there is no strain on the push-pull rod 20 and consequently the carbon resistance elements 44 and 45 are at the normal or balance points, and there is no appreciable voltage at bridge points 60 and 61. The relay 78 is therefore deenergized and the spring 80 closes contact 77, permitting relay coil 75 of relay 69 to be energized and closing contact 68 to energize the motor for flap lowering. Motor rotation causes the rod element 31 to screw outwardly until switch 71 is opened, when the motor stops.

As soon as the plane takes on speed air flow on the lowered flaps imparts a high degree of lift and enables the plane to take-off at distances substantially shorter than would otherwise normally be possible. However, the increase in speed produces an increasing pressure on the wing flaps with increasing strain on the push-pull rod and enclosed control element 40. At a predetermined pressure the relay 78 is actuated to move the armature 79 to close contact 76 thus closing contact 67 of relay 69 and reversing the field direction of the motor. Thereupon the motor rotates in reverse direction and screw element 31 moves to the left and flaps 18 and 19 begin to move upwardly. Immediately the pressure on the flaps is reduced and sensitive relay contact 77 is closed again starting a flap lowering. The speed, however, is constantly increasing and hence the flaps are again raised, this oscillation continuing in diminishing amplitude as the speed approaches a normal constant value. The pilot then moves the gang switches to points A2—B2, at which points the bridge and relay 78 are by-passed and coil 74 of relay 69 is continuously energized to hold the flaps in up-position, or normal flight movement.

On landing the general procedure is similar to that at take-off but by virtue of resistor 66 the point of flap movement is changed. Preparatory to landing as the speed declines approaching the landing field the pilot moves the gang switches to points A4, B4. The A4 contact is identical in effect and circuit to the A1 contact: however the B4 contact introduces resistor 66 in the bridge circuit, thus reducing the current flow and increasing the flap pressure point necessary to produce bridge action to raise the flaps. For example, by proper adjustment of resistance 66 at take-off the flap may move up at 3,000 lbs. per square inch, whereas on landing the flaps will move up at a pressure of 5,000 lbs. per square inch. This differential is desirable since as soon as the plane is clear at take-off it is important that the flap angle be rapidly reduced to improve the rate of climb; and on landing it is desirable that the air flow be effective to impart a considerable wing lift as the plane speed is being reduced, and it is apparent that these two points may not coincide in value.

It is important to note that the precise point of effective flap lowering on landing may not be accurately predetermined and hence the flaps may be lowered at such an airplane speed, for example over 100 miles an hour, which will damage the flap structure, or controls. The described arrangement overcomes this difficulty since with switch contacts A4—B4 closed the control strain gauge functions to raise the flaps should flap pressures be excessive. On lowering of pressures, however, to those at which the flaps should function, as for example, those effective below 90 miles an hour, the flaps retain a down position.

Since conditions as well as flap types vary, provision is made for variation of flap pressures at which raising takes place in both take-off and landing switch positions. For example, bridge circuit resistance 56 and 57 may be changed in value to secure this variation. Also, relay contacts 76 and 77 and spring base 81 may be varied in distance relative to each other, or the tension of spring 81 may be modified, so as to change the precise point at which the armature 79 functions.

Attention is particularly directed to the feature of the invention wherein control of the movement of the wing flaps is obtained by variation and strain in the push-pull rod connecting the flaps, this arrangement establishing a direct association between wing flap pressure and the means for controlling flap movement. Accordingly it is possible to obtain an approximately linear relationship between flap pressure and associated control operating points. By this means as demonstrated by repeated tests the effect of airplane vibration on the control unit is practically eliminated. Moreover the control action is direct and positive.

Temperature control 64 may be of conventional form such as a spiral bimetallic arm contact movable on a curvilinear line of series resistance points to vary resistance with temperature change. It may be observed that the bridge method reduces current consumption to approximately 0.25 ampere, and that the weight and displacement of parts are not excessive, these being factors of importance in airplane construction and use.

Additional modifications may be made and hence no limitation is intended in the disclosure as outlined other than is required by the scope of the claims hereunto appended.

What is claimed is:

1. In an airplane, opposite wings each having vertically swingable rear flaps, a motor means for moving said flaps, power transmission means between the motor means and flaps to impart either up or down flap movement, a strain control unit in said transmission means and forming a part thereof, and connections separated from said transmission means between said control unit and motor means for energizing said motor means to lift or lower said flaps in accordance with the strain-produced condition of said control unit.

2. In airplane flap control, a pivoted flap subject to varying air loads, a motor for varying the position of said flap, a transmission rod between said flap and motor, a load sensitive device connected to said rod, and motor energizing control connections independent of said rod between the motor and load sensitive device for translating load strain on said rod into motor operation to cause flap movement to compensate for said load strain.

3. In airplane flap control apparatus, a pivoted flap subject to variable air pressure, power means for varying the flap angle to change the load thereon, power transmission means between the flap and power means, load sensitive means connected to said power transmission means, and independent power means energizing control connections between the load sensitive means and power means operative to energize said power means to actuate said flap to reduce load thereon with increase of air pressure on the flap.

MICHAEL WATTER.